(12) United States Patent
Ohnuki et al.

(10) Patent No.: US 8,735,503 B2
(45) Date of Patent: May 27, 2014

(54) COMPOSITION FOR SEMICONDUCTIVE RUBBER, CROSSLINKED RUBBER PRODUCT, AND SEMICONDUCTIVE PARTS

(75) Inventors: Kohji Ohnuki, Osaka (JP); Yoritaka Yasuda, Osaka (JP); Taro Ozaki, Osaka (JP)

(73) Assignee: Daiso Co., Ltd., Osaka-shi (JP)

(*) Notice: Subject to any disclaimer, the term of this patent is extended or adjusted under 35 U.S.C. 154(b) by 0 days.

(21) Appl. No.: 13/501,725

(22) PCT Filed: Oct. 14, 2010

(86) PCT No.: PCT/JP2010/068060
§ 371 (c)(1),
(2), (4) Date: Apr. 12, 2012

(87) PCT Pub. No.: WO2011/046175
PCT Pub. Date: Apr. 21, 2011

(65) Prior Publication Data
US 2012/0208966 A1    Aug. 16, 2012

(30) Foreign Application Priority Data

Oct. 16, 2009  (JP) .................. 2009-239729
Oct. 16, 2009  (JP) .................. 2009-239789

(51) Int. Cl.
*C08F 283/06* (2006.01)
(52) U.S. Cl.
USPC ........................................ 525/404; 525/403
(58) Field of Classification Search
USPC ................................................. 525/403, 404
See application file for complete search history.

(56) References Cited

U.S. PATENT DOCUMENTS

| 2,996,538 | A | * | 8/1961 | Van Dijk et al. ............ 560/217 |
| 6,159,389 | A |   | 12/2000 | Miura et al. |
| 6,881,529 | B2 | * | 4/2005 | Iwasaki ........................ 430/166 |
| 2007/0041752 | A1 | * | 2/2007 | Mizumoto et al. ........... 399/286 |

FOREIGN PATENT DOCUMENTS

| JP | 62-112653 A | 5/1987 |
| JP | 3-59045 A | 3/1991 |
| JP | 7-2922235 A | 11/1995 |
| JP | 10-95891 A | 4/1998 |
| JP | 11-269263 A | 10/1999 |
| JP | 2000-63656 A | 2/2000 |
| JP | 2002-53705 A | 2/2002 |
| JP | 2002-155171 A | 5/2002 |
| JP | 2005-148467 A | 6/2005 |
| JP | 2009-69782 A | 4/2009 |
| JP | 2009-69783 A | 4/2009 |

OTHER PUBLICATIONS

Office Action issued Jun. 7, 2013 in corresponding Chinese Patent Application No. 201080046717.X.

* cited by examiner

*Primary Examiner* — Robert Jones, Jr.
(74) *Attorney, Agent, or Firm* — Knobbe Martens Olson & Bear LLP

(57) ABSTRACT

A composition for a semiconductive rubber, comprising an epichlorohydrin-based rubber (a), an ethylene oxide-modified (meth)acrylate (b), and at least one kind of a crosslinking agent (c) selected from the group consisting of a sulfur-based crosslinking agent, a quinoxaline-based crosslinking agent and a triazine-based crosslinking agent.

7 Claims, No Drawings

COMPOSITION FOR SEMICONDUCTIVE RUBBER, CROSSLINKED RUBBER PRODUCT, AND SEMICONDUCTIVE PARTS

CROSS-REFERENCE TO RELATED APPLICATIONS

This application is the U.S. National Phase under 35. U.S.C. §371 of International Application PCT/JP2010/068060, filed Oct. 14, 2010, which claims priority to Japanese Patent Application No. 2009-239729, filed Oct. 16, 2009 and Japanese Patent Application No. 2009-239789, filed Oct. 16, 2009. The International Application was published under PCT Article 21(2) in a language other than English.

TECHNICAL FIELD

The present invention relates to a semiconductive composition having low hardness and exhibiting low-resistant ionic conductivity, which is used in electrophotographic equipment applications and the like, and a crosslinked rubber product obtained by vulcanizing the same composition.

BACKGROUND ART

An epichlorohydrin-based rubber material has widely been used as parts of office automation apparatuses by making use of specific ionic conductivity thereof. Further a reduction in resistance and a reduction in hardness have been required to parts of office automation apparatus. Electrophotographic equipment applications will be described below as an example of a semiconductive member. However, applications of the present invention are not limited only to electrophotographic equipment applications.

In image forming apparatuses such as electrophotographic equipments, a direct contact charging system has recently employed as a means to charge a surface of a body to be charged of a photoreceptor, a dielectric or the like. In the direct contact charging system, a surface of a body to be charged is charged by directly bringing a charged member applied with voltage into contact with the surface of a body to be charged. The charged member to be generally used is a roller in which a semiconductive elastic body layer is formed on an axis of a mandrel made of metal or the like.

It have hitherto been known, as a method for forming a semiconductive elastic body layer, a method in which an electronic conducting semiconductive composition having semiconductivity by blending conductive particles such as carbon black, and a crosslinked rubber product are used, and a method in which a polar rubber per se having semiconductivity, such as an epichlorohydrin rubber or a nitrilebutadiene rubber is used (see Patent Document 1).

In the method in which a semiconductive composition using a polar rubber having semiconductivity, and a crosslinked rubber product are used, there is known, as a technique to cope with a reduction in hardness, a method in which a liquid rubber is blended so as to reduce hardness (see Patent Document 2).

However, in the method in which an electronic conducting semiconductive crosslinked rubber product having semiconductivity by blending conductive particles such as carbon black is used, it is difficult to control the hardness of a rubber composition. Also in the method in which a polar rubber per se having semiconductivity is used, there are requirements for further reductions in resistance and hardness. Thus, a problem to be solved is that it is difficult to reconcile both requirements and design freedom is low.

PRIOR ART DOCUMENTS

Patent Documents

Patent Document 1: JP-A-2000-063656
Patent Document 2: JP-A-2005-148467

SUMMARY OF THE INVENTION

Problems to be Solved by the Invention

An object of the present invention is to reconcile low hardness and low resistance by blending an ion-conductive polar rubber with various additives.

Solutions to the Problems

The present inventors have intensively studied about the above problems and found that it is possible to reconcile low hardness and low resistance of a crosslinked rubber product by blending an epichlorohydrin-based rubber with an ethylene oxide-modified (meth)acrylate and vulcanizing the obtained blend using at least one kind of a crosslinking agent selected from the group consisting of a sulfur-based crosslinking agent, a quinoxaline-based crosslinking agent and a triazine-based crosslinking agent. Thus, the present invention has been completed.

Advantages of the Invention

A composition with uniform low resistance value and low hardness can be obtained in an epichlorohydrin-based rubber by crosslinking the composition of the present invention.

MODE FOR CARRYING OUT THE INVENTION

The constitution of the present invention will be described in detail below.

Semiconductive Rubber Composition

The semiconductive rubber composition of the present invention refer to a composition before vulcanization, and contains at least an epichlorohydrin-based rubber (a), an ethylene oxide-modified (meth)acrylate (b), and at least one kind of a crosslinking agent (c) selected from the group consisting of a sulfur-based crosslinking agent, a quinoxaline-based crosslinking agent and a triazine-based crosslinking agent.

Epichlorohydrin-Based Rubber

The epichlorohydrin-based rubber (a) in the present invention refers to an epichlorohydrin homopolymer or other epoxides copolymerizable with or epichlorohydrin, for example, a copolymer with ethylene oxide, propylene oxide, allyl glycidyl ether or the like. Examples thereof include an epichlorohydrin homopolymer, an epichlorohydrin-ethylene oxide copolymer, an epichlorohydrin-propylene oxide copolymer, an epichlorohydrin-ethylene oxide-allyl glycidyl ether tercopolymer, an epichlorohydrin-ethylene oxide-propylene oxide-allyl glycidyl ether tetracopolymer and the like. There is no particular limitation on the molecular weight of these homopolymers or copolymers, and the molecular weight is usually from about 30 to 150 in terms of Mooney viscosity ML1+4 (100° C.).

When the sulfur-based crosslinking agent is used as a crosslinking agent, it is necessary to use an epichlorohydrin-ethylene oxide-allyl glycidyl ether tercopolymer which is crosslinkable with the sulfur-based crosslinking agent. As long as a large influence is not exerted on crosslinking physical properties, an epichlorohydrin homopolymer and an epichlorohydrin-ethylene oxide dicopolymer may be blended.

With respect to a copolymerization ratio of the epichlorohydrin-ethylene oxide-allyl glycidyl ether tercopolymer, for example, the content of epichlorohydrin is from 4 mol % to 94 mol %, preferably from 9 mol % to 74 mol %, and more preferably from 9 to 64 mol %; the content of ethylene oxide is from 5 mol % to 95 mol %, preferably from 25 mol % to 90 mol %, and more preferably from 35 mol % to 90 mol %; and the content of allyl glycidyl ether is from 1 mol % to 8 mol %, preferably from 1 mol % to 7 mol %, and more preferably from 1 mol % to 6 mol %.

On the other hand, when the quinoxaline-based crosslinking agent and/or the triazine-based crosslinking agent is/are used as the crosslinking agent, the epichlorohydrin-based rubber (a) is preferably an epichlorohydrin homopolymer, an epichlorohydrin-ethylene oxide copolymer or an epichlorohydrin-ethylene oxide-allyl glycidyl ether tercopolymer, more preferably an epichlorohydrin-ethylene oxide copolymer or an epichlorohydrin-ethylene oxide-allyl glycidyl ether tercopolymer. These polymers may be a blend.

In case of an epichlorohydrin-ethylene oxide copolymer, with respect to the copolymerization ratio thereof, the content of epichlorohydrin is from 5 mol % to 95 mol %, preferably from 10 mol % to 75 mol %, and more preferably from 10 to 65 mol %; and the content of ethylene oxide is from 5 mol % to 95 mol %, preferably from 25 mol % to 90 mol %, and more preferably from 35 mol % to 90 mol %.

In case of an epichlorohydrin-ethylene oxide-allyl glycidyl ether tercopolymer, with respect to the copolymerization ratio thereof, for example, the content of epichlorohydrin is from 4 mol % to 94 mol %, preferably from 9 mol % to 74 mol %, and more preferably from 9 to 64 mol %; the content of ethylene oxide is from 5 mol % to 95 mol %, preferably from 25 mol % to 90 mol %, and more preferably from 35 mol % to 90 mol %; and the content of allyl glycidyl ether is from 1 mol % to 8 mol %, preferably from 1 mol % to 7 mol %, and more preferably from 1 mol % to 6 mol %.

Ethylene Oxide-Modified (Meth)acrylate

The ethylene oxide-modified (meth)acrylate (b) used in the present invention is represented by the general formula (I):

[Chemical Formula 1]

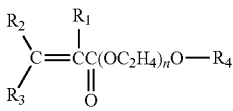

(I)

wherein n represents an integer of 1 to 30, and $R_1$ to $R_4$ may be the same or different and represent a hydrogen atom, an alkyl group having 1 to 5 carbon atoms or a substituted alkyl group having 1 to 5 carbon atoms.

In the formula, from the viewpoints of a reduction in resistance, environment dependency, stability of resistance in variation with time, and compatibility with a polymer, n is preferably from 1 to 20, more preferably from 6 to 16, and particularly preferably from 7 to 11.

$R_1$ to $R_4$ are preferably hydrogen atoms or alkyl groups having 1 to 5 carbon atoms, and particularly preferably hydrogen atoms, methyl groups or ethyl groups.

The ethylene oxide-modified (meth)acrylate (b) used in the present invention is preferably methoxypolyethylene glycol methacrylate represented by the general formula (II):

[Chemical Formula 2]

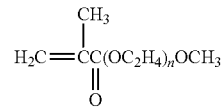

(II)

wherein n represents an integer of 1 to 20.

In the formula, from the viewpoints of a reduction in resistance, environment dependency, stability of resistance in variation with time, and compatibility with a polymer, n is preferably from 6 to 16, and more preferably from 7 to 11.

There is no particular limitation on the molecular weight of the ethylene oxide-modified (meth)acrylate, and the molecular weight is usually about 25 in terms of viscosity in mPa/S (25° C.).

The amount of the ethylene oxide-modified (meth)acrylate blended is from 5 to 40 parts by weight, preferably from 8 to 35 parts by weight, and more preferably from 10 to 30 parts by weight, based on 100 parts by weight of the epichlorohydrin-based rubber. When the amount blended is within the above range, it is preferred since rubber characteristics required as a crosslinked product are not impaired while enabling a reduction in hardness and a reduction in resistance of the crosslinked product.

Crosslinking Agent

The crosslinking agent (c) used in the present invention is selected from the group consisting of a sulfur-based crosslinking agent, a quinoxaline-based crosslinking agent and a triazine-based crosslinking agent.

There is no particular limitation on the sulfur-based crosslinking agent as long as it is capable of crosslinking an allyl glycidyl ether group, and sulfur, morpholine polysulfides, thiuram polysulfides and the like are used. Specific examples of the sulfur include-powdered sulfur, precipitated sulfur, colloidal sulfur, surface-treated sulfur, insoluble sulfur, nonhazardous sulfur and the like; examples of the morpholine polysulfides include morpholine disulfide; and examples of the thiuram polysulfides include tetramethyl thiuram disulfide, tetraethyl thiuram disulfide, tetrabutyl thiuram disulfide, dipentamethylene thiuram tetrasulfide, dipentamethylene thiuram hexasulfide and the like.

Examples of the quinoxaline-based crosslinking agent include 2,3-dimercaptoquinoxaline, quinoxaline-2,3-dithiocarbonate, 6-methylquinoxaline-2,3-dithiocarbonate, 5,8-dimethylquinoxaline-2,3-dithiocarbonate and the like, and 6-methylquinoxaline-2,3-dithiocarbonate is preferable.

Examples of the triazine-based crosslinking agent include 2,4,6-trimercapto-1,3,5-triazine, 2-hexylamino-4,6-dimercaptotriazine, 2-diethylamino-4,6-dimercaptotriazine, 2-cyclohexylamino-4,6-dimercaptotriazine, 2-dibutylamino-4,6-dimercaptotriazine, 2-anilino-4,6-dimercaptotriazine, 2-phenylamino-4,6-dimercaptotriazine and the like, and 2,4,6-trimercapto-1,3,5-triazine is preferable.

The amount of the crosslinking agent (c) blended is from 0.1 to 10 parts by weight, preferably from 0.3 to 5 parts by weight, and more preferably from 0.5 to 1.5 parts by weight, based on 100 parts by weight of the epichlorohydrin-based rubber. When the amount blended is less than 0.1 parts by weight based on 100 parts by weight of the tercopolymer, the degree of crosslinking becomes insufficient. On the other hand, when the amount blended is more than 10 parts by weight based on 100 parts by weight of the tercopolymer, the crosslinked product becomes too rigid to obtain physical properties that are usually expected as the crosslinked rubber product. The crosslinking agent may be used alone, or two or more kinds of them may be used in combination.

Vulcanization Accelerator

In the present invention, it is possible to use a known vulcanization accelerator which is usually used in combination with these crosslinking agents.

When the sulfur-based crosslinking agent is used as the crosslinking agent (c), a known vulcanization accelerator used in combination with the sulfur-based crosslinking agent can be used without any limitation, and examples thereof include thiuram polysulfides, mercaptobenzothiazoles, morpholine sulfides, sulfenamides and the like.

Examples of the thiuram polysulfides include tetramethyl thiuram disulfide, tetraethyl thiuram disulfide, tetrabutyl thiuram disulfide, dipentamethylene thiuram tetrasulfide, dipentamethylene thiuram hexasulfide and the like; examples of the mercaptobenzothiazoles include mercaptobenzothiazole, dibenzothiazyl disulfide and various metal salts of 2-mercaptobenzothiazole, cyclohexylamine salts of 2-mercaptobenzothiazole; 2-(N,N-diethylthiocarbamoylthio)benzothiazole, 2-(4'-morpholinodithio)benzothiazole and the like; examples of the morpholine sulfides include morpholine disulfide, 2-mercaptobenzothiazole and the like; and examples of the sulfenamides include N-cyclohexyl-2-benzothiazylsulfenamide, N,N-dicyclohexyl-2-benzothiazylsulfenamide, N-oxydiethylene-2-benzothiazylsulfenamide, N-tert-butyl-2-benzothiazylsulfenamide, N-tert-butyl-di(2-benzothiazole)sulfenimide and the like.

The amount of the vulcanization accelerator blended for use in the present invention is preferably from 0.1 to 5 parts by weight, and more preferably from 0.5 to 3 parts by weight, based on 100 parts by weight of the epichlorohydrin-based rubber (a).

When the quinoxaline-based crosslinking agent and/or triazine-based crosslinking agent are used as the crosslinking agent (c), examples of a known vulcanization accelerator used in combination with these crosslinking agents include sulfur, morpholine sulfides, amines, weak acid salts of amine, basic silica, quaternary ammonium salts, quaternary phosphonium salts, alkali metal salts of fatty acid, thiuram sulfides, polyfunctional vinyl compound, mercaptobenzothiazoles, sulfenamides, dimethiocarbamates and the like. When the quinoxaline-based crosslinking agent is applied to the composition of the present invention, examples of particularly preferred accelerator include a 1,8-diazabicyclo(5,4,0)undecene-7 (hereinafter abbreviated to DBU) salt and a 1,5-diazabicyclo(4,3,0)nonene-5 (hereinafter abbreviated to DBN) salt.

Examples of the DBU salt include a DBU-carbonate, a DBU-stearic acid salt, a DBU-2-ethylhexylic acid salt, a DBU-benzoic acid salt, a DBU-salicylic acid salt, a DBU-3-hydroxy-2-naphthoic acid salt, a DBU-phenol resin salt, a DBU-2-mercaptobenzothiazole salt, a DBU-2-mercaptobenzimidazole salt and the like. Examples of the DBN salt include a DBN-carbonate, a DBN-stearic acid salt, a DBN-2-ethylhexylic acid salt, a DBN-benzoic acid salt, a DBN-salicylic acid salt, a DBN-3-hydroxy-2-naphthoic acid salt, a DBN-phenol resin salt, a DBN-2-mercaptobenzothiazole salt, a DBN-2-mercaptobenzimidazole salt and the like. When these DBU salts and/or DBN salts are used as the accelerator, the amount blended is preferably from 0.1 to 5 parts by weight, and more preferably from 0.5 to 3 parts by weight, based on 100 parts by weight of the epichlorohydrin-based rubber (a).

Examples of a retarder used in the present invention include N-cyclohexylthiophthalimide, phthalic anhydride, an organozinc compound, acidic silica and the like. The amount of the retarder blended is preferably from 0 to 10 parts by weight, and more preferably from 0.1 to 5 parts by weight, based on 100 parts by weight of the epichlorohydrin-based rubber (a).

Acid Acceptor

A known acid acceptor can be used as an acid acceptor used in the present invention, and the acid acceptor is preferably a metal compound and/or an inorganic microporous crystal. Examples of the metal compound include an oxide, a hydroxide, a carbonate, a carboxylate, a silicate, a borate and a phosphite of metals of Group II of the Periodic Table (Group 2 and Group 12); an oxide, a hydroxide, a carboxylate, a silicate, a sulfate, a nitrate and a phosphate of metals of Group III of the Periodic Table (Group 3 and Group 13); and an oxide, a basic carbonate, a basic carboxylate, a basic phosphite, a basic sulfite and a tribasic sulfate of metals of Group IV of the Periodic Table (Group 4 and Group 14).

Specific examples of the metal compound include magnesia, magnesium hydroxide, aluminum hydroxide, barium hydroxide, sodium carbonate, magnesium carbonate, barium carbonate, calcium oxide, calcium hydroxide, calcium carbonate, calcium silicate, calcium stearate, zinc stearate, calcium phthalate, calcium phosphite, zinc white, tin oxide, litharge, red lead, white lead, dibasic lead phthalate, dibasic lead carbonate, tin stearate, basic lead phosphite, basic tin phosphite, basic lead sulfite, tribasic lead sulfate and the like, and sodium carbonate, magnesia, magnesium hydroxide, calcium oxide, calcium hydroxide, calcium silicate, zinc white and the like are preferable.

The inorganic microporous crystal means a crystalline porous material, and can be clearly distinguished from amorphous porous materials, for example, silica gel, alumina and the like. Examples of the inorganic microporous crystal include zeolites, aluminophosphate type molecular sieve, layered silicate, synthetic hydrotalcite, titanic acid alkali metal salt and the like. Examples of the particularly preferable acid acceptor include synthetic hydrotalcite.

Examples of the zeolites include, in addition to natural zeolites, various zeolites such as A-, X- and Y-type synthetic zeolites, sodalites, natural or synthetic mordenite, ZSM-5, and the metal-substituted zeolites thereof. These zeolites may be used alone, or two or more kinds of them may be used in combination. Metal of metal-substituted zeolites is often sodium. The zeolites preferably have large acid-accepting ability, and A-type zeolite is preferable.

The synthetic hydrotalcite is represented by the following general formula (3):

$$Mg_XZn_YAl_Z(OH)_{(2(X+Y)+3Z-2)}CO_3 \cdot wH_2O \quad (3)$$

wherein x and y represent a real number of 0 to 10 and satisfy a relation: x+y=1 to 10, respectively, z represents a real number of 1 to 5, and w represents a real number of 0 to 10.

Examples of the hydrotalcites represented by the general formula (1) include $Mg_{4.5}Al_2(OH)_{13}CO_3 \cdot 3.5H_2O$, $Mg_{4.5}Al_2(OH)_{13}CO_3$, $Mg_4Al_2(OH)_{12}CO_3 \cdot 3.5H_2O$, $Mg_6Al_2(OH)_{16}CO_3 \cdot 4H_2O$, $Mg_5Al_2(OH)_{14}CO_3 \cdot 4H_2O$, $Mg_3Al_2(OH)_{10}CO_3 \cdot 1.7H_2O$, $Mg_3ZnAl_2(OH)_{12}CO_3 \cdot 3.5H_2O$, $Mg_3ZnAl_2(OH)_{12}CO_3$ and the like.

The amount of the acid acceptor blended is preferably from 0.2 to 50 parts by weight, more preferably from 0.5 to 50 parts by weight, and particularly preferably from 1 to 20 parts by weight, based on 100 parts by weight of the epichlorohydrin-based rubber (a). When the amount blended is within the above range, it is preferred since crosslinking is sufficiently performed and the crosslinked product does not become too rigid, and thus physical properties to be usually expected as an epichlorohydrin-based rubber crosslinked product is obtained.

The composition for a semiconductive rubber used in the present invention can be optionally blended with various blending agents used usually in the art, for example, vulcanization retarders, rubber antioxidants, fillers, reinforcers, plasticizers, processing aids, pigments, flame retardants and the like.

Processing Method

In order to produce a crosslinked rubber product according to the present invention, any blending means, which have hitherto been used in the field of polymer processing, for example, a mixing roll, a Banbury mixer, various kneaders and the like can be used. Semiconductive electronic parts of the present invention can be usually obtained by heating the composition of the present invention within a range from 100 to 200° C. The vulcanization time varies depending on the temperature, and is usually within a range from 0.5 to 300 minutes. There is no particular limitation on a method of vulcanization molding and, for example, a compression molding method and an injection molding method using a mold, and a method of heating using a steam can, an air oven or the like can be suitably used.

EXAMPLES

The present invention will be specifically explained by using examples and comparative examples. However, the present invention is not limited to the following examples as long as it does not depart from the gist of the present invention.

Blending agents used in examples are as follows.
1: Epichlorohydrin-based rubber: epichlorohydrin-ethylene oxide-allyl glycidyl ether copolymer manufactured by DAISO CO., LTD., "EPION301"
2: Ethylene oxide-modified (meth)acrylate A: methoxypolyethylene glycol #400 methacrylate (average number of ethylene oxide units: 9 (n=9))
3: Ethylene oxide-modified (meth)acrylate B: methoxypolyethylene glycol #1000 methacrylate (average number of ethylene oxide units: 23 (n=23))
4: OH group-containing acrylic polymer A: manufactured by TOAGOSEI CO., LTD., "ARUFON UH-2000"
5: OH group-containing acrylic polymer B: manufactured by TOAGOSEI CO., LTD., "ARUFON UH-2170"
6: COOH group-containing acrylic polymer: manufactured by TOAGOSEI CO., LTD., "ARUFON UC-3000"
7: Thiuram-based vulcanization accelerator: manufactured by OUCHI SHINKO CHEMICAL INDUSTRIAL CO., LTD., "NOCCELER TS"
8: Thiazole-based vulcanization accelerator: manufactured by OUCHI SHINKO CHEMICAL INDUSTRIAL CO., LTD., "NOCCELER DM"
9: Liquid NBR: manufactured by JSR Corporation, JSR N280
10: Plasticizer: manufactured by DAISO CO., LTD., "DB-02"
11: Thiuram-based vulcanization accelerator: manufactured by OUCHI SHINKO CHEMICAL INDUSTRIAL CO., LTD., "NOCCELER TT"
12: Morpholine sulfide-based vulcanization accelerator: manufactured by OUCHI SHINKO CHEMICAL INDUSTRIAL CO., LTD., "VULNOC R"
13: Hydrotalcite: synthetic hydrotalcite manufactured by Kyowa Chemical Industry Co., Ltd., "DHT-4A"
14: DBU salt-based vulcanization accelerator: Phenol resin salt of DBU manufactured by DAISO CO., LTD., "P-152"
15: Quinoxaline-based crosslinking agent: 6-methylquinoxaline-2,3-dithiocarbonate manufactured by DAISO CO., LTD., "DAISONET XL-21S"

The respective materials shown in the following Tables 1, 4 and 5 were kneaded by an open roll to produce an unvulcanized rubber sheet. The obtained unvulcanized rubber sheet was subjected to press vulcanization at 170° C. for 15 minutes. The obtained crosslinked sheet was conditioned under an environment of 23° C./50% RH, and then a volume resistivity value was measured in accordance with JIS K6271 by HIRESTA manufactured by Mitsubishi Yuka K. K. using a double-ring electrode.

The respective materials shown in the following Tables 2, 6 and 7 were kneaded by a kneader mixer and an open roll to produce an unvulcanized rubber sheet. The obtained unvulcanized rubber sheet was subjected to press vulcanization at 170° C. for 15 minutes. The obtained crosslinked sheet was conditioned under an environment of 23° C./50% RH, and then a volume resistivity value was measured in accordance with JIS K6271 by HIRESTA manufactured by Mitsubishi Yuka K. K. using a double-ring electrode.

The respective materials shown in the following Tables 3, 8 and 9 were kneaded by a kneader mixer and an open roll to produce an unvulcanized rubber sheet. The unvulcanized rubber sheet was subjected to press vulcanization at 170° C. for 15 minutes. The obtained crosslinked sheet was conditioned under environments of 10° C./15% RH, 23° C./50% RH and 35° C./85% RH, and a volume resistivity value was measured in accordance with JIS K6271 by HIRESTA manufactured by Mitsubishi Yuka K. K. using a double-ring electrode, and then the environment dependency of the crosslinked product was evaluated.

Rubber hardness was measured in accordance with JIS K6253 by ASKER type A Durometer manufactured by KOBUNSHI KEIKI Co., Ltd.

TABLE 1

|  | Example 1 | Example 2 | Comparative Example 1 | Comparative Example 2 | Comparative Example 3 | Comparative Example 4 |
|---|---|---|---|---|---|---|
| Epichlorohydrin - based rubber *1 | 100 | 100 | 100 | 100 | 100 | 100 |
| Ethylene oxide - modified (meth)acrylate A *2 | 20 |  |  |  |  |  |
| Ethylene oxide - modified (meth)acrylate B *3 |  | 20 |  |  |  |  |
| OH group - containing acrylic polymer A *4 |  |  |  | 20 |  |  |
| OH group - containing acrylic polymer B *5 |  |  |  |  | 20 |  |

TABLE 1-continued

|  | Example 1 | Example 2 | Comparative Example 1 | Comparative Example 2 | Comparative Example 3 | Comparative Example 4 |
|---|---|---|---|---|---|---|
| COOH group - containing acrylic polymer *6 |  |  |  |  |  | 20 |
| Zinc oxide | 5 | 5 | 5 | 5 | 5 | 5 |
| Zinc stearate | 1 | 1 | 1 | 1 | 1 | 1 |
| 2-mercaptobenzimidazole zinc salt | 0.5 | 0.5 | 0.5 | 0.5 | 0.5 | 0.5 |
| Sulfur | 1 | 1 | 1 | 1 | 1 | 1 |
| Thiuram - based vulcanization accelerator *7 | 0.5 | 0.5 | 0.5 | 0.5 | 0.5 | 0.5 |
| Thiazole - based vulcanization accelerator *8 | 1 | 1 | 1 | 1 | 1 | 1 |
| Hardness of vulcanized product (JIS A) | 35 | 37 | 46 | NT | 38 | 56 |
| Volume resistivity value $\Omega \cdot cm$ (23° C./50% RH) | $4.5 \times 10^6$ | $6.1 \times 10^6$ | $9.8 \times 10^6$ | NT | $3.1 \times 10^7$ | $6.2 \times 10^7$ |

*In Comparative Example 2, evaluation was not carried out since components were not satisfactorily kneaded at the time of kneading and it was impossible to evaluate.

TABLE 2

|  | Example 3 | Example 4 | Comparative Example 5 | Comparative Example 6 | Comparative Example 7 | Comparative Example 8 |
|---|---|---|---|---|---|---|
| Epichlorohydrin - based rubber *1 | 80 | 80 | 100 | 80 | 80 | 80 |
| Ethylene oxide - modified (meth)acrylate A *2 | 20 |  |  |  |  | 20 |
| Ethylene oxide - modified (meth)acrylate B *3 |  | 20 |  |  |  |  |
| Liquid NBR *9 |  |  |  | 20 | 20 |  |
| Light calcium carbonate | 30 | 30 | 30 | 30 | 30 | 30 |
| N-550 carbon | 3 | 3 | 3 | 3 | 3 | 3 |
| Zinc oxide | 5 | 5 | 5 | 5 | 5 | 5 |
| Plasticizer *10 |  |  | 3 |  | 3 |  |
| Zinc stearate | 1 | 1 | 1 | 1 | 1 |  |
| 2-mercaptobenzimidazole zinc salt | 0.5 | 0.5 | 0.5 | 0.5 | 0.5 |  |
| Sulfur | 0.5 | 0.5 | 0.5 | 0.5 | 1 |  |
| Dicumyl peroxide |  |  |  |  |  | 1.2 |
| Thiuram - based vulcanization accelerator *11 | 1.5 | 1.5 | 1.5 | 1.5 | 1.5 |  |
| Morpholine sulfide - based vulcanization accelerator *12 | 1.5 | 1.5 | 1.5 | 1.5 | 1.5 |  |
| Hardness of vulcanized product (JIS A) | 38 | 47 | 52 | 38 | 37 | NT |
| Volume resistivity value $\Omega \cdot cm$ (23° C./50% RH) | $3.1 \times 10^6$ | $3.8 \times 10^6$ | $6.7 \times 10^6$ | $1.7 \times 10^8$ | $1.8 \times 10^8$ | NT |

TABLE 3

|  | Example 5 | Example 6 |
|---|---|---|
| Epichlorohydrin-based rubber *1 | 80 | 80 |
| Ethylene oxide-modified (meth)acrylate A *2 | 20 |  |
| Ethylene oxide-modified (meth)acrylate B *3 |  | 20 |
| Light calcium carbonate | 30 | 30 |
| N-550 carbon | 3 | 3 |
| Zinc oxide | 5 | 5 |
| Zinc stearate | 1 | 1 |
| 2-mercaptobenzimidazole zinc salt | 0.5 | 0.5 |
| Sulfur | 0.5 | 0.5 |
| Thiuram-based vulcanization accelerator *11 | 1.5 | 1.5 |
| Morpholine sulfide-based vulcanization accelerator *12 | 1.5 | 1.5 |
| Volume resistivity value $\Omega \cdot cm$ |  |  |
| 10° C./15% RH | $1.6 \times 10^7$ | $2.6 \times 10^8$ |
| 23° C./50% RH | $3.1 \times 10^6$ | $3.8 \times 10^6$ |
| 35° C./85% RH | $2.6 \times 10^5$ | $2.3 \times 10^6$ |

The present invention will be more detail explained by using examples.

The examples and comparative examples described in Table 1 are crosslinked products obtained by blending an epichlorohydrin-based rubber with only a crosslinking agent. The crosslinked products obtained by blending with the ethylene oxide-modified (meth)acrylate of the examples were crosslinked rubber products with low resistance value and low hardness as compared with crosslinked products obtained by blending with no ethylene oxide-modified (meth)acrylate of the comparative examples, or blending with various acrylic polymers. In Comparative Example 2, evaluation could not be carried out since it was impossible to knead.

The examples and comparative Examples described in Table 2 are crosslinked products obtained by blending an epichlorohydrin-based rubber with fillers used generally in the relevant applications. The crosslinked products obtained by blending with the ethylene oxide-modified (meth)acrylate of the examples were crosslinked rubber products with low resistance value and low hardness as compared with crosslinked products obtained by blending with no ethylene oxide-modified (meth)acrylate of the comparative examples, or blending with a liquid NBR. In Comparative Example 8 subjected to peroxide crosslinking, the crosslinked product could not be evaluated since it was brittle in case of removing from a mold at the time of crosslinking.

In Example 5 and Example 6 described in Table 3, the environment dependency of the crosslinked products obtained by blending with the ethylene oxide-modified (meth)acrylate of the present invention is evaluated. When a small number of ethylene oxide units of the ethylene oxide-modified (meth)acrylate are included (for example, the number of ethylene oxide units is from 6 to 16), the environment dependency decreases, and therefore it is more preferable.

TABLE 4

|  | Example 7 | Example 8 | Comparative Example 9 |
|---|---|---|---|
| Epichlorohydrin-based rubber *1 | 100 | 100 | 100 |
| Ethylene oxide-modified (meth)acrylate A *2 | 20 | | |
| Ethylene oxide-modified (meth)acrylate B *3 | | 20 | |
| Hydrotalcite *13 | 3 | 3 | 3 |
| Zinc stearate | 1 | 1 | 1 |
| 2-mercaptobenzimidazole zinc salt | 0.5 | 0.5 | 0.5 |
| N-cyclohexylthiophtalimide | 0.5 | 0.5 | 0.5 |
| DBU salt-based vulcanization accelerator *14 | 1.0 | 1.0 | 1.0 |
| Quinoxaline-based cross-linking agent *15 | 1.5 | 1.5 | 1.5 |
| Hardness of vulcanized product (JIS A) | 27 | 28 | 39 |
| Volume resistivity value Ω · cm (23° C./50% RH) | $3.3 \times 10^6$ | $5.2 \times 10^6$ | $6.6 \times 10^6$ |

TABLE 5

|  | Example 9 | Example 10 | Comparative Example 10 |
|---|---|---|---|
| Epichlorohydrin-based rubber *1 | 100 | 100 | 100 |
| Ethylene oxide-modified (meth)acrylate A *2 | 20 | | |
| Ethylene oxide-modified (meth)acrylate B *3 | | 20 | |
| Magnesia | 3 | 3 | 3 |
| Zinc stearate | 1 | 1 | 1 |
| 2-mercaptobenzimidazole zinc salt | 0.5 | 0.5 | 0.5 |
| N-cyclohexylthiophthalimide | 0.5 | 0.5 | 0.5 |
| 2,4,6-trimercapto-1,3,5-triazine | 1.2 | 1.2 | 1.2 |
| Hardness of vulcanized product (JIS A) | 26 | 27 | 37 |
| Volume resistivity value Ω · cm (23° C./50% RH) | $5.0 \times 10^6$ | $4.8 \times 10^6$ | $9.3 \times 10^6$ |

TABLE 6

|  | Example 11 | Example 12 | Comparative Example 11 | Comparative Example 12 |
|---|---|---|---|---|
| Epichlorohydrin-based rubber *1 | 80 | 80 | 100 | 80 |
| Ethylene oxide-modified (meth)acrylate A *2 | 20 | | | |
| Ethylene oxide-modified (meth)acrylate B *3 | | 20 | | |
| Liquid NBR *9 | | | | 20 |
| Light calcium carbonate | 30 | 30 | 30 | 30 |
| N-550 carbon | 3 | 3 | 3 | 3 |
| Hydrotalcite *13 | 3 | 3 | 3 | 3 |
| Zinc stearate | 1 | 1 | 1 | 1 |
| 2-mercaptobenzimidazole zinc salt | 0.5 | 0.5 | 0.5 | 0.5 |
| N-cyclohexyl-thiophtalimide | 0.5 | 0.5 | 0.5 | 0.5 |
| DBU salt-based vulcanization accelerator *14 | 1.0 | 1.0 | 1.0 | 1.0 |
| Quinoxaline-based cross-linking agent *15 | 1.5 | 1.5 | 1.5 | 1.5 |
| Hardness of vulcanized product (JIS A) | 35 | 37 | 47 | 33 |
| Volume resistivity value Ω · cm (23° C./50% RH) | $3.6 \times 10^6$ | $7.9 \times 10^6$ | $1.0 \times 10^7$ | $2.3 \times 10^7$ |

TABLE 7

|  | Example 13 | Example 14 | Comparative Example 13 | Comparative Example 14 | Comparative Example 15 |
|---|---|---|---|---|---|
| Epichlorohydrin-based rubber *1 | 80 | 80 | 100 | 80 | 80 |
| Ethylene oxide-modified (meth)acrylate A *2 | 20 | | | | |
| Ethylene oxide-modified (meth)acrylate B *3 | | 20 | | | |
| Liquid NBR *9 | | | | 20 | |
| Light calcium carbonate | 30 | 30 | 30 | 30 | 30 |
| N-550 carbon | 3 | 3 | 3 | 3 | 3 |
| Hydrotalcite *13 | 3 | 3 | 3 | 3 | 3 |
| Zinc stearate | 1 | 1 | 1 | 1 | 1 |
| 2-mercaptobenzimidazole zinc salt | 0.5 | 0.5 | 0.5 | 0.5 | 0.5 |
| N-cyclohexylthiophtalimide | 0.5 | 0.5 | 0.5 | 0.5 | 0.5 |
| 2,4,6-trimercapto-1,3,5-triazine | 1.2 | 1.2 | 1.2 | 1.2 | |
| Dicumyl peroxide | | | | | 1.2 |
| Hardness of vulcanized product (JIS A) | 34 | 35 | 45 | 36 | NT |
| Volume resistivity value Ω · cm (23° C./50% RH) | $5.0 \times 10^6$ | $8.8 \times 10^6$ | $1.2 \times 10^7$ | $1.8 \times 10^7$ | NT |

TABLE 8

|  | Example 15 | Example 16 |
|---|---|---|
| Epichlorohydrin-based rubber *1 | 80 | 80 |
| Ethylene oxide-modified (meth)acrylate A *2 | 20 |  |
| Ethylene oxide-modified (meth)acrylate B *3 |  | 20 |
| Light calcium carbonate | 30 | 30 |
| N-550 carbon | 3 | 3 |
| Hydrotalcite *13 | 3 | 3 |
| Zinc stearate | 1 | 1 |
| 2-mercaptobenzimidazole zinc salt | 0.5 | 0.5 |
| N-cyclohexylthiophtalimide | 0.5 | 0.5 |
| DBU salt-based vulcanization accelerator *14 | 1.0 | 1.0 |
| Quinoxaline-based crosslinking agent *15 | 1.5 | 1.5 |
| Volume resistivity value Ω·cm |  |  |
| 10° C./15% RH | $2.4 \times 10^7$ | $1.6 \times 10^{11}$ |
| 23° C./50% RH | $3.6 \times 10^6$ | $7.9 \times 10^6$ |
| 35° C./85% RH | $3.7 \times 10^5$ | $3.0 \times 10^5$ |

TABLE 9

|  | Example 17 | Example 18 |
|---|---|---|
| Epichlorohydrin-based rubber *1 | 80 | 80 |
| Ethylene oxide-modified (meth)acrylate A *2 | 20 |  |
| Ethylene oxide-modified (meth)acrylate B *3 |  | 20 |
| Light calcium carbonate | 30 | 30 |
| N-550 carbon | 3 | 3 |
| Hydrotalcite *13 | 3 | 3 |
| Zinc stearate | 1 | 1 |
| 2-mercaptobenzimidazole zinc salt | 0.5 | 0.5 |
| N-cyclohexylthiophtalimide | 0.5 | 0.5 |
| 2,4,6-trimercapto-1,3,5-triazine | 1.5 | 1.5 |
| Volume resistivity value Ω·cm |  |  |
| 10° C./15% RH | $5.7 \times 10^7$ | $1.3 \times 10^{11}$ |
| 23° C./50% RH | $5.0 \times 10^6$ | $8.8 \times 10^6$ |
| 35° C./85% RH | $4.7 \times 10^5$ | $2.2 \times 10^5$ |

The present invention will be described in more detail below by way of examples.

The examples and comparative examples shown in Tables 4 and 5 are crosslinked products obtained by blending an epichlorohydrin-based rubber with only a crosslinking agent. The crosslinked products obtained by blending with the ethylene oxide-modified (meth)acrylate of the examples were crosslinked rubbers with low resistance value and low hardness as compared with the crosslinked products obtained by blending with no ethylene oxide-modified (meth)acrylate of the comparative examples.

The examples and comparative Examples described in Tables 6 and 7 are crosslinked products obtained by blending an epichlorohydrin-based rubber with fillers which are generally used in the relevant applications. The crosslinked products obtained by blending with the ethylene oxide-modified (meth)acrylate of the example were crosslinked rubbers with low resistance value and low hardness as compared with the crosslinked product obtained by blending with no ethylene oxide-modified (meth)acrylate of the comparative examples, or obtained by blending with a liquid NBR. In Comparative Example 15 subjected to peroxide crosslinking, the crosslinked product could not be evaluated since it was brittle in case of removing from a mold at the time of crosslinking.

In Examples 15 to 18 described in Tables 8 and 9, the environment dependency of the crosslinked products obtained by blending the ethylene oxide-modified (meth)acrylate of the present invention is evaluated. When a small number of ethylene oxide units of the ethylene oxide-modified (meth)acrylate are included (for example, the number of ethylene oxide units is from 6 to 16), the environment dependency decreases, and therefore it is more preferable.

INDUSTRIAL APPLICABILITY

The crosslinked rubber product of the present invention can be widely applied in the field where semiconductive rubber parts are usually used. For example, the crosslinked rubber product is useful as a charge roll, transfer roll, development roll and rubber blade for electrophotographic equipment.

The invention claimed is:

1. A composition for a semiconductive rubber, comprising an epichlorohydrin-based rubber (a), an ethylene oxide-modified (meth)acrylate (b) represented by the following general formula (I), and at least one kind of a crosslinking agent (c) selected from the group consisting of a sulfur-based crosslinking agent, a quinoxaline-based crosslinking agent and a triazine-based crosslinking agent:

[Chemical Formula 1]

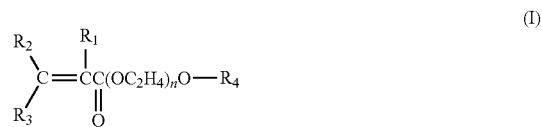

(I)

wherein n represents an integer of 1 to 30, and $R_1$ to $R_4$ are the same or different and represent a hydrogen atom, an alkyl group having 1 to 5 carbon atoms or a substituted alkyl group having 1 to 5 carbon atoms, and wherein an amount of the ethylene oxide-modified (meth)acrylate blended is from 8 to 35 parts by weight.

2. The composition for a semiconductive rubber according to claim 1, wherein the ethylene oxide-modified (meth)acrylate (b) is a methoxypolyethylene glycol methacrylate represented by the general formula (II):

[Chemical Formula 2]

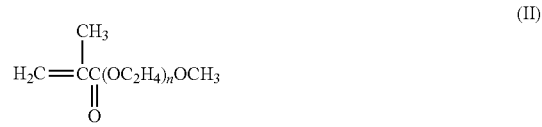

(II)

wherein n represents an integer of 1 to 20.

3. The composition for a semiconductive rubber according to claim 2, wherein the methoxypolyethylene glycol methacrylate represented by the general formula (II) includes 6 to 16 ethylene oxide units (having a structure of the general formula (II) in which n is from 6 to 16).

4. The composition for a semiconductive rubber according to claim 1, wherein the epichlorohydrin-based rubber (a) is at least one kind selected from the group consisting of an epichlorohydrin homopolymer, an epichlorohydrin-ethylene oxide dicopolymer and an epichlorohydrin-ethylene oxide-allyl glycidyl ether tercopolymer.

5. The composition for a semiconductive rubber according to claim 1, wherein the epichlorohydrin-based rubber (a) is a tercopolymer of epichlorohydrin-ethylene oxide-allyl glycidyl ether, or a blend of a tercopolymer of epichlorohydrin-ethylene oxide-allyl glycidyl ether with an epichlorohydrin homopolymer, or a blend of a tercopolymer of epichlorohydrin-ethylene oxide-allyl glycidyl ether with an epichlorohydrin-ethylene oxide dicopolymer.

6. A crosslinked rubber product obtained by crosslinking the composition for a semiconductive rubber according to claim 1.

7. A semiconductive part using the crosslinked rubber product according to claim 6.

* * * * *